US011820085B2

United States Patent
Endres

(10) Patent No.: US 11,820,085 B2
(45) Date of Patent: Nov. 21, 2023

(54) METHOD AND A SYSTEM FOR PRODUCING A COMPONENT OR SEMIFINISHED PRODUCT WITH A FIBRE-REINFORCED FOAM CORE

(71) Applicant: Airbus Operations GmbH, Hamburg (DE)

(72) Inventor: Gregor Christian Endres, Hamburg (DE)

(73) Assignee: Airbus Operations GmbH

(*) Notice: Subject to any disclaimer, the term of this patent is extended or adjusted under 35 U.S.C. 154(b) by 559 days.

(21) Appl. No.: 16/876,250

(22) Filed: May 18, 2020

(65) Prior Publication Data
US 2020/0376779 A1 Dec. 3, 2020

(30) Foreign Application Priority Data
May 29, 2019 (DE) ...................... 10 2019 114 433.7

(51) Int. Cl.
*B29C 70/08* (2006.01)
*B29C 44/56* (2006.01)
(Continued)

(52) U.S. Cl.
CPC .......... *B29C 70/086* (2013.01); *B29C 44/569* (2013.01); *B32B 5/18* (2013.01); *B32B 2260/046* (2013.01)

(58) Field of Classification Search
CPC ..... B29C 44/569; B29C 70/08; B29C 70/086; B29C 70/24; B29C 70/546; B29C 70/547;
(Continued)

(56) References Cited

U.S. PATENT DOCUMENTS 3,030,256 A * 4/1962 Rosenthal ............... E04C 2/205
428/95
2002/0153084 A1* 10/2002 Johnson ................... E01C 9/086
156/148
(Continued)

FOREIGN PATENT DOCUMENTS

DE 102005024408 A1 11/2006
DE 102008001826 B3 9/2009
(Continued)

OTHER PUBLICATIONS

German Search Report for Application No. 102019114433.7 dated Nov. 18, 2019, 7 pages.

*Primary Examiner* — Philip C Tucker
*Assistant Examiner* — Brian R Slawski
(74) *Attorney, Agent, or Firm* — Lerner David LLP

(57) ABSTRACT

A method for producing a component with a fibre-reinforced foam core has the steps of supplying a foam core having a first main surface and an opposite, second main surface, positioning at least one needle at the first main surface of the foam core, piercing the foam core with the needle, with the result that a needle tip penetrates through the first main surface into the foam core and then through the second main surface, hooking a reinforcing fibre into the needle tip, pulling the needle back, with the result that the reinforcing fibre is pulled through the foam core, and coating the reinforcing fibre with a resin while the needle is being pulled back.

7 Claims, 5 Drawing Sheets

(51) Int. Cl.
 *B32B 5/08* (2006.01)
 *B32B 5/18* (2006.01)

(58) Field of Classification Search
 CPC ......... B29C 65/62; B29C 65/72; B29C 65/48;
  B29C 65/526; B29C 66/721; B29C
  66/727; B29L 2031/3076; B32B
  2260/046; B32B 5/06; B32B 5/18; B32B
  5/073; B32B 5/245; E04C 2/243
 USPC ....... 156/60, 91, 92, 93, 148, 290, 291, 293;
  112/475.01, 475.08; 28/107, 112;
  428/102, 103, 104
 See application file for complete search history.

(56) References Cited

U.S. PATENT DOCUMENTS

| | | | |
|---|---|---|---|
| 2008/0226876 A1* | 9/2008 | Roth | B29C 70/24 |
| | | | 156/256 |
| 2009/0252917 A1 | 10/2009 | Weber et al. | |
| 2011/0135868 A1 | 6/2011 | Endres et al. | |
| 2015/0322608 A1 | 11/2015 | Endres et al. | |
| 2017/0320290 A1* | 11/2017 | Endres | B29C 70/24 |

FOREIGN PATENT DOCUMENTS

| | | | |
|---|---|---|---|
| DE | 102012110122 A1 | 4/2014 | |
| DE | 102012023815 A1 | 6/2014 | |

* cited by examiner

METHOD AND A SYSTEM FOR PRODUCING A COMPONENT OR SEMIFINISHED PRODUCT WITH A FIBRE-REINFORCED FOAM CORE

FIELD OF THE INVENTION

The invention relates to a method and a system for producing a component or semifinished product with a fibre-reinforced foam core.

BACKGROUND OF THE INVENTION

In modern means of transport such as commercial aircraft, different dimensioning conditions are imposed on materials and components. In addition to high levels of strength specific to the application, a particularly low weight is often demanded. For economical production, the production costs should furthermore be as low as possible and the installation of the components concerned should be easy to carry out. One known practice for aeronautical applications is to use core-type composite or sandwich materials, which have a core enclosed by two or more covering layers. The covering layers can be made from a fibre-reinforced plastic, a metallic material or a combination thereof. The use for these purposes of a core composed of a honeycomb material or a foamed material is known.

Sandwich materials in which a foam core is reinforced with fibres introduced into the composite are known. These reinforcing fibres are infiltrated by means of resin and are thereby bonded for permanent contact with the foam core and the covering layers. This technology is known as "tied foam core" (TFC). During production, a needle penetrates through the composite consisting of the foam core and the covering layers and, in the process, pulls a dry fibre or a bundle of dry fibres through the composite. Resin is then applied from the outside, e.g. to infiltrate the covering layers, wherein, with vacuum assistance, the resin also comes to settle around the fibres by virtue of a wicking or capillary effect along the needle passages. In a final method step, the preform produced in this way is cured. The use of dry fibres is advantageous in order to protect a sewing device used for this purpose from contamination during the introduction of the fibres.

BRIEF SUMMARY OF THE INVENTION

The production process and the component properties of a sandwich material having a foam core could be improved if covering layers composed of a prepreg material were used. However, under the application of a vacuum or press pressure, the resin in the covering layers could seal off the dry needle passages against the escape of the enclosed air, which would make pore-free production of components more difficult. Enclosed air would collect in the form of pores in the region of cover layer attachment and would lead to unwanted material properties as a result. Pre-infiltration of a pure foam preform before impregnated covering layers were applied would be possible in principle according to the prior art, but would involve an additional method step and therefore higher production costs.

Consequently, an aspect of the invention is to propose an alternative method for producing a component with a fibre-reinforced foam core which can be carried out quickly and easily and reliably prevents contamination of a sewing device, even when using pre-impregnated covering layers.

A method for producing a component with a fibre-reinforced foam core is proposed, the method having the steps of supplying a foam core having a first main surface and an opposite, second main surface, positioning at least one needle at the first main surface of the foam core, piercing the foam core with the needle, with the result that a needle tip penetrates through the first main surface into the foam core and then through the second main surface, hooking a reinforcing fibre into the needle tip, pulling the needle back, with the result that the reinforcing fibre is pulled through the foam core, and coating the reinforcing fibre with a resin while the needle is being pulled back.

The foam core can be produced in a separate step or can at least be cut out from a separately produced foam material. In particular, the foam material can be a closed-cell foam material, which is relatively dimensionally stable and preferably prevents infiltration of resin into pores of the foam material. In addition to a flat embodiment of the foam core, a foam core with different thicknesses in some region or regions and/or a flat or three-dimensionally curved shape is of course also conceivable. The shape of the substrate for receiving the foam core can be matched thereto.

To insert reinforcing fibres, a suitable needle is positioned in such a way that it can be passed through the foam core by means of a preferably linear motion. During this process, the needle successively pierces the first main surface, the foam core and the second main surface. By hooking a reinforcing fibre into the needle tip, it can be pulled through the foam core.

The reinforcing fibre can be shaped by means of various deflection points to form loops with the same side length which can be hooked at an apex into a needle hook located at the needle tip. This can be both a matter of a single loop and/or a meandering pattern with any number of repetitions, which are accordingly pulled into the foam core by an equivalent number of needles.

One special feature of the method according to an aspect of the invention is that, despite the use of dry fibres, a separate infiltration step for infiltrating the fibres is not necessary. This ensures that the initially dry reinforcing fibre concerned is coated with a resin immediately while the needle is being pulled back. This preferably takes place directly at a penetration opening in the second main surface. Consequently, a sewing device required for moving the needle and supplying the reinforcing fibres is not contaminated by liquid resin, and therefore no precautions have to be taken in this regard.

A component or semifinished product produced in this way is suitable particularly for use in a means of transport. It can be covered with covering layers composed of a pre-impregnated woven fibre fabric of any kind. From this, it would be possible to produce different cabin components for a commercial aircraft, e.g. floor panels, flaps, walls of cabin monuments, cabin linings or similar. Use in the automotive industry, in shipbuilding or, more generally, in the transport sector is likewise conceivable.

The reinforcing fibres pulled through the foam core can then be cut to length and/or folded onto the first and second main surface. The foam core provided with impregnated reinforcing fibres can then be covered by covering layers, e.g. layers composed of a pre-impregnated semifinished fibre product.

The method according to an aspect of the invention allows the simple use of pre-impregnated covering layers since a separate step for infiltrating the reinforcing fibres is not necessary. At the same time, infiltration of the reinforcing fibres in a separate preparatory step, i.e. before the application of the covering layers and after the reinforcing fibres have been pulled in, is likewise not required. Consequently, the implementation of the method according to the invention is advantageous since effort, time and costs for the production of the component can be significantly reduced.

Piercing by the needle preferably comprises penetration into a needle hole of a needle plate, on which the foam core is laid, wherein coating of the reinforcing fibre is carried out by a coating device in the needle hole. Consequently, the needle can penetrate through the foam core into a needle hole situated below or behind the latter, which ensures sufficient mobility of the needle and the simultaneous surface contact of the foam core. By virtue of its positioning in the needle hole, the coating device can ensure sufficient spatial separation with respect to the sewing device and other components to be protected. The needle should be moved in such a way that it moves completely through the needle hole, after which a loop can be hooked into the needle. For reasons of stability, the needle plate and consequently the needle hole have a not inconsiderable component thickness. There is accordingly sufficient installation space there to position a coating device by means of which the resin can be applied to the fibres without a loop formation mechanism situated underneath, for example, being compromised. Moreover, the fibre can no longer unhook from the needle after the entry of the needle into the foam core, and any forces which are applied during the impregnation process do not lead to fibre loss and hence to a skipped stitch. Consequently, the reinforcing fibre is coated with resin immediately before penetration into the foam core. The advantage of this procedure is that, on the one hand, an additional method step is eliminated and, on the other hand, the quantity of resin introduced is reduced to the necessary minimum required to impregnate the fibres. Any cavities consisting of foam pores, which are filled with resin in an infusion step, are not filled here, to the benefit of the component weight.

To control resin application, it is preferred if coating is begun as soon as the reinforcing fibre is in the process of entering the foam core, and is ended as soon as the reinforcing fibre has been pulled completely into the foam core.

In an advantageous embodiment, the coating device can have a roll arrangement, through which the reinforcing fibre is passed. The roll arrangement can have one or preferably a plurality of rolls, which act as transfer components. They can be connected to a source of resin and can wet the fibre with resin by passing over said fibre. The use of rolls can also be recommended inter alia for liquid and viscous resins.

The coating device can furthermore also have nozzles which apply the resin to the reinforcing fibre. It is conceivable to use a single nozzle. However, it may be advantageous to provide at least two nozzles, which provide the reinforcing fibre concerned with resin from two different directions. The use of nozzles is expedient especially with liquid or less viscous resin.

It would also be conceivable to use an electrostatically operating coating device which is designed to take up a powdered resin by means of an electrostatic charge and to apply it to the reinforcing fibre concerned. It is likewise conceivable to use a roll or roll arrangement for this purpose. It would be conceivable to provide heating for the coating device, ensuring that the resin is softened during or after application in order to achieve adhesion to the reinforcing fibre concerned.

The roll arrangement could have at least two calender rolls, which can be moved into surface contact with the reinforcing fibre for coating and can be moved away from the reinforcing fibre to interrupt coating. The calender rolls can each be mounted so as to be rotatable about an axis. By movement of the calender rolls in a direction transverse to the respective axis, it is possible to selectively adopt or leave a coating position in which the respective calender roll comes into surface contact with the fibre concerned. The calender rolls could be formed from a metallic material and be mounted so as to be actively rotated or passively rotatable. The calender rolls are arranged relative to one another in such a way that a gap with a predetermined gap size can be formed between them. The mobility should be implemented especially transversely to a direction in which the reinforcing fibres are passed through. It is conceivable to heat the calender rolls in order to allow better adhesion of the resin.

To produce the surface contact, the calender rolls could preferably be moved up to the reinforcing fibre on both sides in order to enclose said fibre. In the enclosed state, the fibre is in close surface contact with the calender rolls and can be provided with a resin layer by wetting.

It is particularly preferred if the calender rolls are moved into surface contact with the reinforcing fibre as soon as the needle tip is in the process of leaving the needle hole. This point in time at which the calender rolls are then brought into surface contact with the reinforcing fibre is suitable for implementing maximum possible wetting of the reinforcing fibre. The needle tip is then located just outside the needle hole when the wetting of the reinforcing fibre begins. Depending on the speed of the needle movement and of the calender rolls, the relevant time can be set by adjusting the mechanism.

The method can furthermore comprise the step of arranging at least one covering layer on the first main surface and/or the second main surface in order to form a first preform. The at least one covering layer can comprise a first covering layer on the first main surface. It can likewise comprise a second covering layer on the second main surface. A preform of the component to be produced is prepared by supplying the foam core and arranging covering layers before the fibres are introduced. The first preform could be penetrated by the needle in order to pull the reinforcing fibre through the composite comprising the foam core and the at least one covering layer. In order to allow the penetration of the needle, it is expedient to produce the at least one covering layer from a textile and, in particular, a dry textile. Given a sufficient strength of the needle and of a matching sewing device, however, there could also be the possibility of producing the at least one covering layer from a pre-impregnated semifinished fibre product (prepreg).

The invention furthermore relates to a system for producing a component or semifinished product with a fibre-reinforced foam core, having a substrate on which the foam core is to be laid, a sewing device having a needle that can be moved at least linearly, a fibre supply device for three-dimensional supply of a fibre, and a coating device, wherein the sewing device is designed to position the needle at a first main surface of the foam core and to pierce the foam core, with the result that a needle tip penetrates through the first main surface into the foam core and then through an oppositely arranged second main surface of the foam core, wherein the fibre supply device is designed to position a supplied reinforcing fibre in such a way that it can be hooked into the needle tip that penetrates the foam core, and wherein the coating device is designed to coat a reinforcing fibre hooked into the needle tip and pulled through the foam core with resin immediately before it enters the foam core.

All the structural features mentioned to explain the method are likewise conceivable as structural features of the system.

As explained above, it is particularly advantageous if the substrate is a needle plate having a needle hole and wherein the sewing device is designed to move the needle through the foam core into the needle hole and back again.

In this case, the coating device could be arranged in, at or below the needle hole. The coating of the fibre then takes place at a location directly before the fibre enters the foam core. In this case, the fibre supply device and/or the sewing device can be protected from contamination by resin application.

The coating device is preferably designed to selectively activate and deactivate a coating mode. Consequently, coating can be controlled by switching into the coating mode or out of the coating mode.

In a particularly preferred embodiment, the coating device is preferably designed to selectively activate and deactivate a coating mode. A coating mode should be understood to mean an operating mode of the coating device in which coating is carried out. Consequently, coating of a fibre moving through the coating device is made possible by activation of the coating mode. The coating process is interrupted by deactivation. Coating can accordingly be interrupted as the needle penetrates in order to hook in the reinforcing fibre. This preferably takes place only when the needle is in the process of leaving the needle hole.

As already explained above, it is advantageous if the coating device has at least two calender rolls, which can be moved in opposite directions and transversely to a needle movement direction, thus enabling the reinforcing fibre to be selectively enclosed for coating. For movement, at least one of the calender rolls can be rotatably mounted on a movable slide. The slide can be connected to a pneumatic, hydraulic, electromagnetic or motorized driving device which is designed to carry out a rapid change of the position of the slide. Both calender rolls are preferably mounted on a respective slide in opposite directions, wherein both slides can be movable by individual driving devices or a common driving device.

In another advantageous embodiment, the coating device has an injection nozzle, which can be brought into fluid communication with a resin feed device. The injection nozzle can be designed to apply resin to a transfer component of the coating device on a side facing away from the fibre, the resin then being applied in turn to the fibre via the transfer component.

In an advantageous embodiment of the system, the coating device can have an arrangement of three calender rolls, of which one pair comprising two calender rolls and a single calender roll are arranged on opposite sides of the needle hole, wherein the calender rolls are arranged in such a way that the single calender roll can be moved into a gap formed between the calender rolls of the pair and can be brought into surface contact with the calender rolls in order to bring the reinforcing fibre into surface contact with the three calender rolls. The reinforcing fibre can thereby be passed through between two roll pairs in order to receive a resin coating.

The needle hole can furthermore be of elongate shape. It could be elliptically shaped, for example. Sufficient space, especially in the longitudinal extent, can thereby be created in order to accommodate a coating device.

BRIEF DESCRIPTION OF THE DRAWINGS

Further features, advantages and possible uses of the present invention will be found in the following description of the embodiment examples and the figures. Here, all the features described and/or depicted, in themselves and in any desired combination, form the subject matter of the invention, even when considered independently of their combination in the individual claims or the dependency references thereof. In the figures, the same reference signs furthermore stand for identical or similar objects.

FIG. 1b shows a detail view of a needle hole in a needle plate from FIG. 1a.

DETAILED DESCRIPTION

Figure 1A:
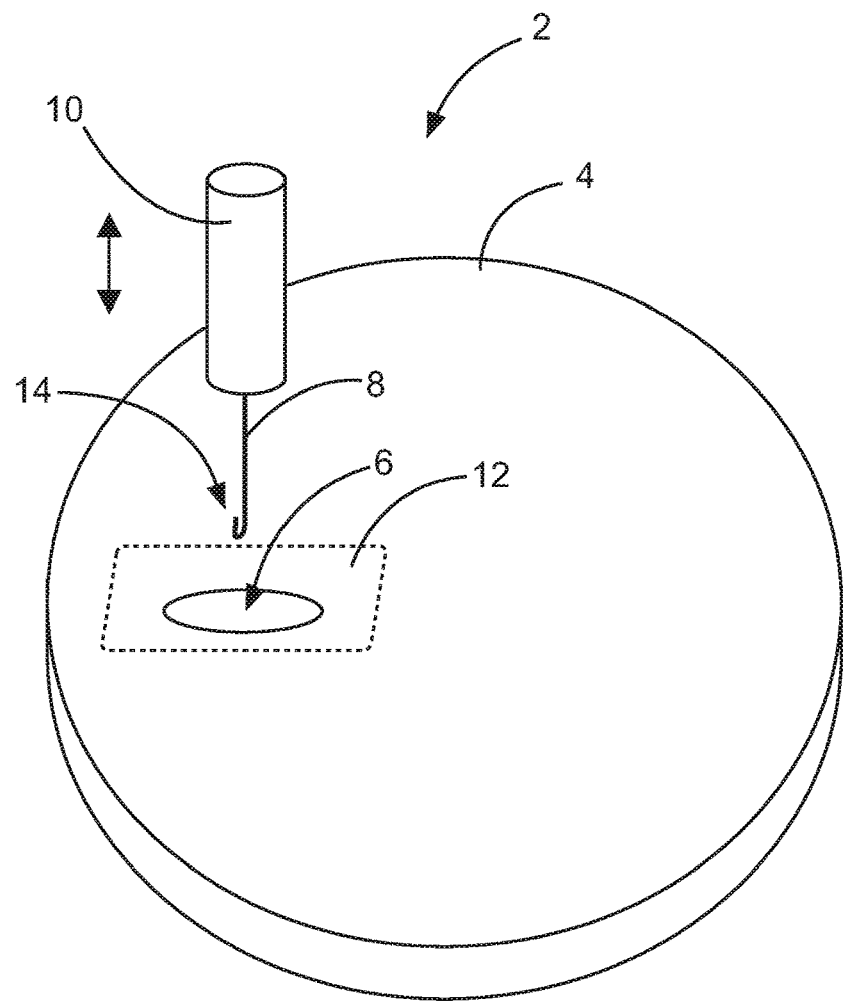
FIG. 1a shows a system for producing a component with a fibre-reinforced foam core in a schematic illustration.

FIG. 1 shows an illustrative embodiment of a system 2 for producing a component with a fibre-reinforced foam core. The system 2 has a substrate 4 in the form of a needle plate, on which a foam core can be laid. The needle plate 4 has a needle hole 6, which, by way of example, is of elliptical design and extends through the entire thickness of the needle plate 4. The needle hole 6 is provided for the purpose of enabling a needle 8, which can be moved at least linearly by a suitably positioned sewing device 10, to pass completely through the needle plate 4. If there is a foam core on the needle plate 4, the needle 8 can pierce the foam core and then enter the needle hole 6.

On an opposite surface (not visible in this illustration) there is a schematically indicated fibre supply device 12, which is designed to hook fibres into a hook 14 at a distal end of the needle 8. In a rearward movement of the needle 8, the hooked-in reinforcing fibre is pulled through the needle hole 6 and then through the foam core located thereon. This process is illustrated in more detail in the figures which follow.

Figure 1B:
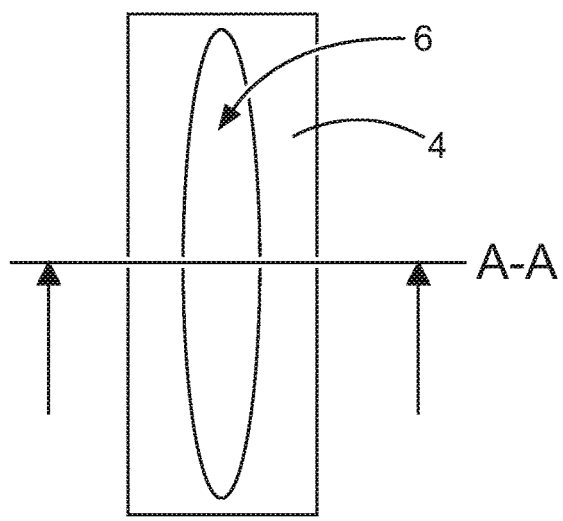

FIG. 1b shows a detail illustration of the elliptical needle hole 6 and a section plane A-A, which serves as a reference for the subsequent illustrations.

Figure 2:
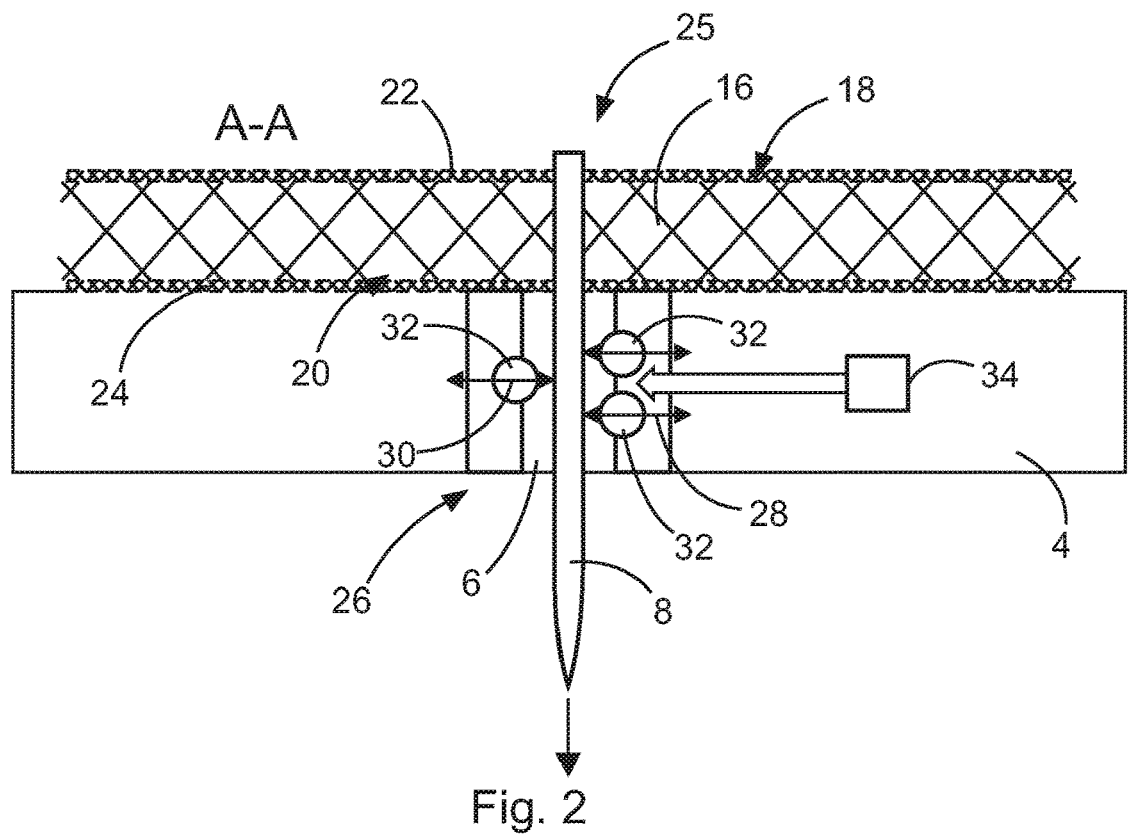
FIGS. 2 to 9 show successive method steps for the production of a component.

FIG. 2 shows the needle plate 4 with a foam core 16 located thereon, which has a first main surface 18 and an opposite, second main surface 20. Purely by way of example and indicated only optionally by dashed lines, the foam core 16 is surrounded by a first covering layer 22 composed of a pre-impregnated sheet-like semifinished fibre product and a second covering layer 24, preferably of the same type. However, since this variant is not essential, the covering layers 22 and 24 are omitted in the figures that follow, although it is always a conceivable variant. The combination of the foam core and the covering layers can be referred to as a first preform 25. In this illustration, the needle 8 is in a position in which the first preform 25 or foam core 16 has been pierced.

A coating device 26 is arranged in the needle hole 6. Purely by way of example, the coating device 26 has a first slide 28 and a second slide 30, which are indicated by movement arrows and can be moved laterally. This means that they can move in the plane of the needle plate 4. By way of example, two calender rolls 32, which can be supplied with a resin via a resin feed device 34, are rotatably arranged on the first slide 28. This is fitted with an injection nozzle, for example. The second slide 30 is fitted with a rotatably mounted calender roll 32, which is arranged between the two calender rolls 32 of the first slide 28 in a vertical direction of the needle plate 4. In this illustration, the calender rolls 32 are spaced apart laterally from the needle 8. Consequently, the coating device 26 is then in a deactivated state.

Figure 3:
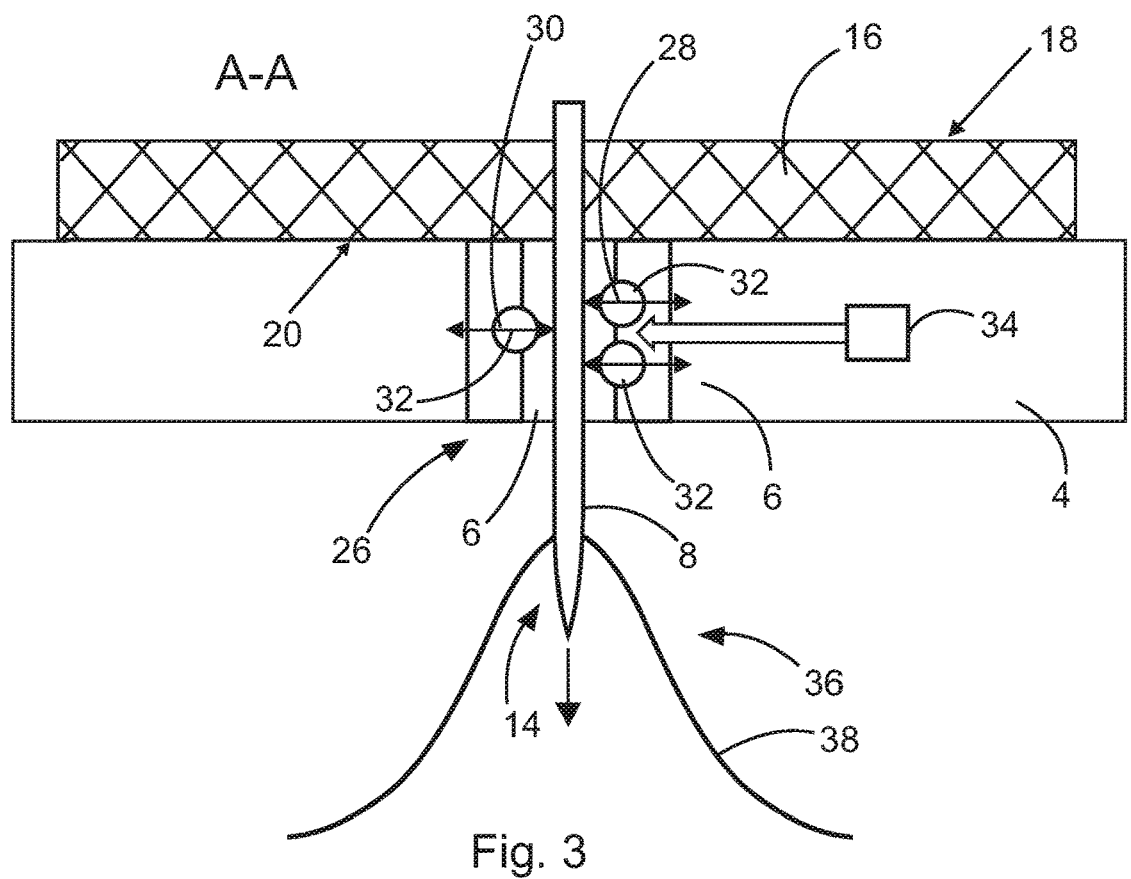

In FIG. 3, a loop 36 of a reinforcing fibre 38 is guided to the needle 8 by the fibre supply device and hooked into the hook 14 there. The needle 8 is in the process of re-emerging through the needle hole 6 and the foam core 16 and, at the same time, taking the reinforcing fibre 38 along with it.

Figure 4:
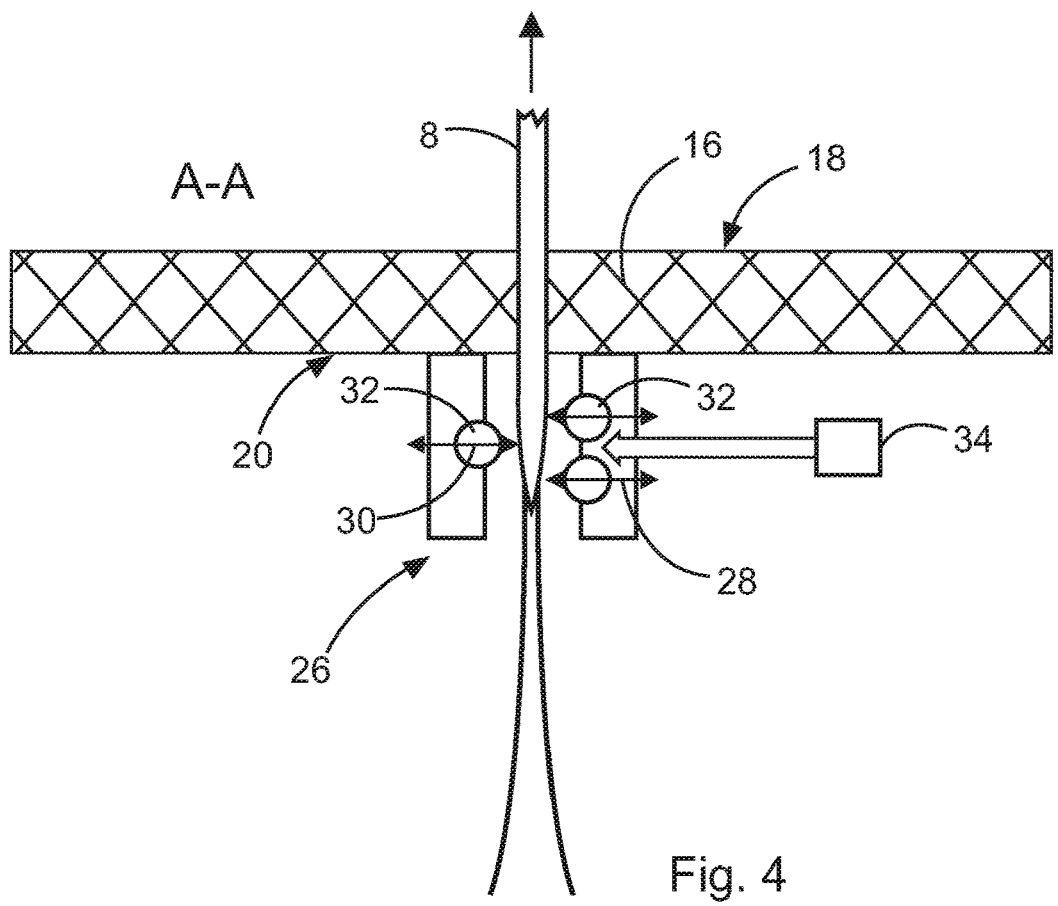

This is shown further in FIG. 4. The coating device 26 is still in the deactivated state, while the needle 8 now extends only about halfway into the needle hole 6.

Figure 5:
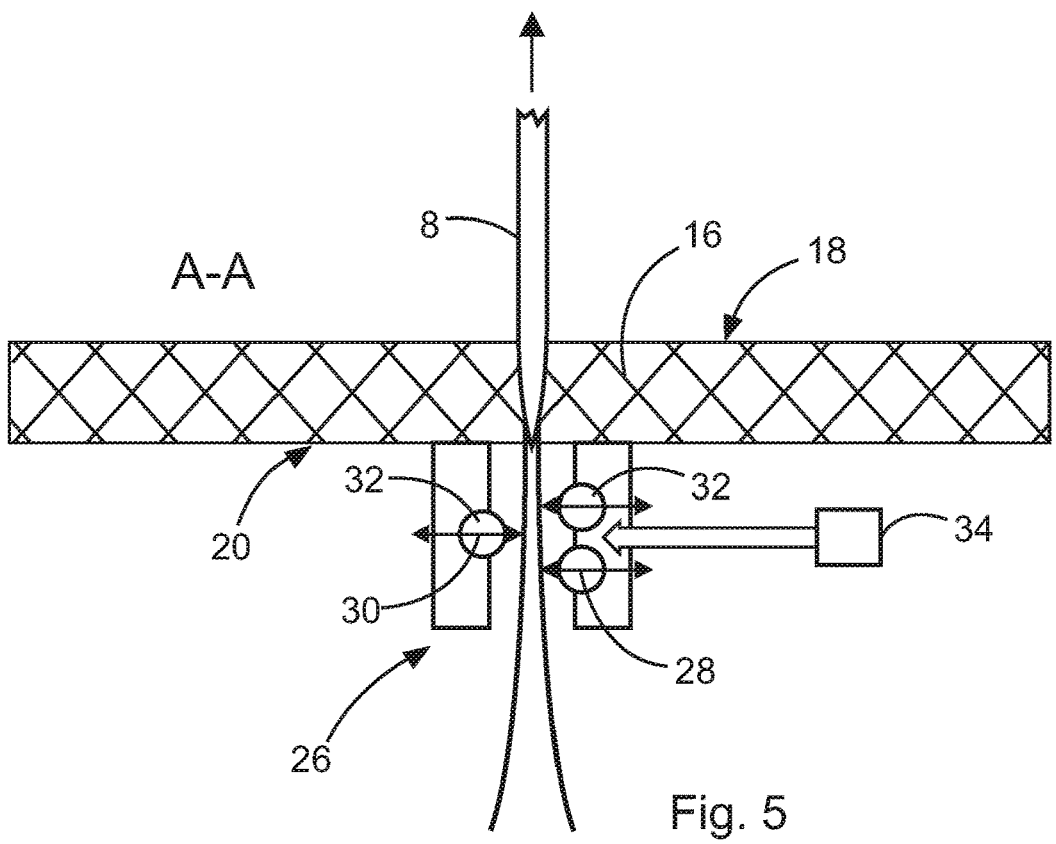

In FIG. 5, the needle 8 is in the process of leaving the needle hole 6. From this time, the coating device 26 could be put into the active state.

Figure 6:
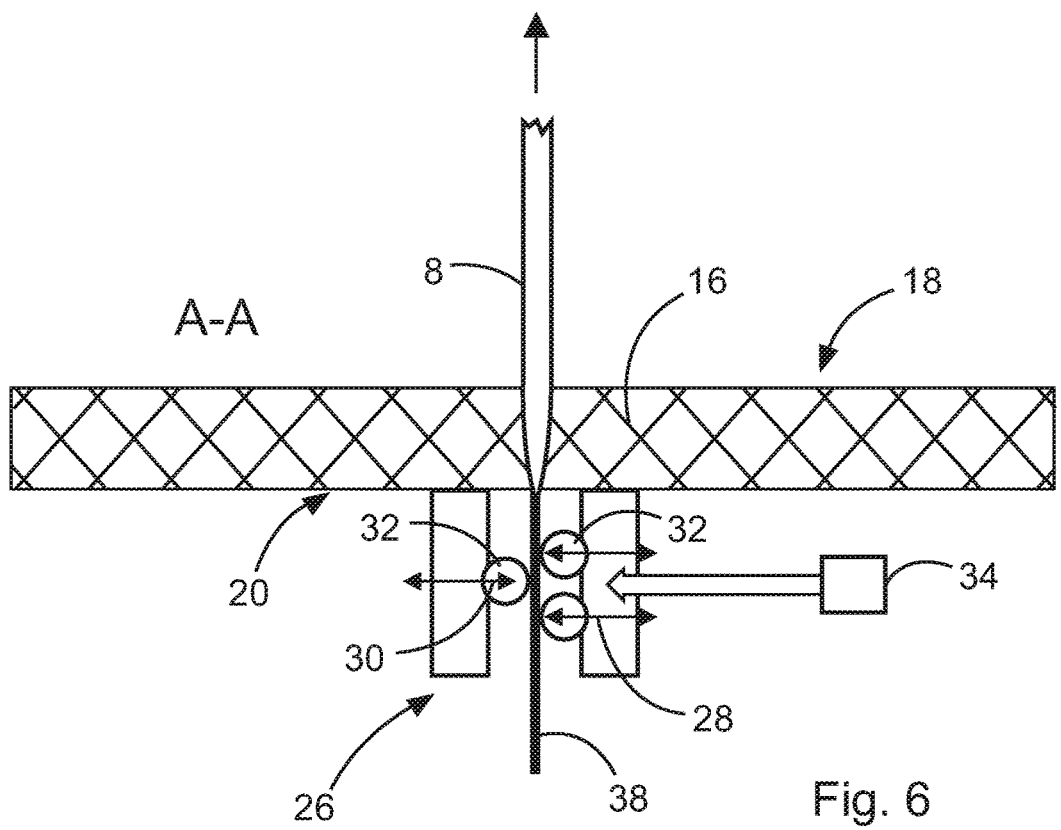
Figure 7:
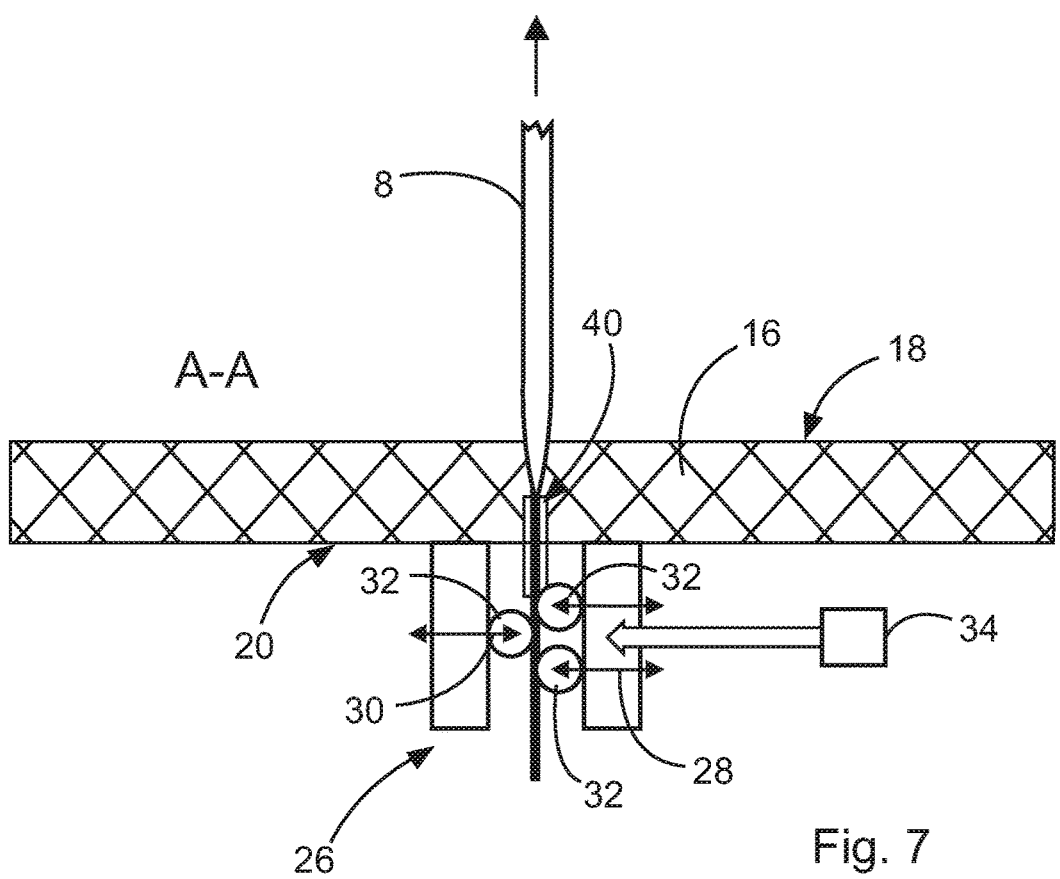

This has been carried out in FIG. 6. The slides 28 and 30 are set in motion in order to move the individual calender rolls 32 toward one another, with the result that the reinforcing fibre 38 passed through is enclosed between them. Resin from the resin feed device 34 is passed to the calender rolls 32, and these therefore apply the resin to the reinforcing fibre 38. Consequently, a reinforcing fibre 38 coated with resin is pulled through the first preform 25. In FIG. 7, the resin coating is indicated by reference sign 40.

Figure 8:
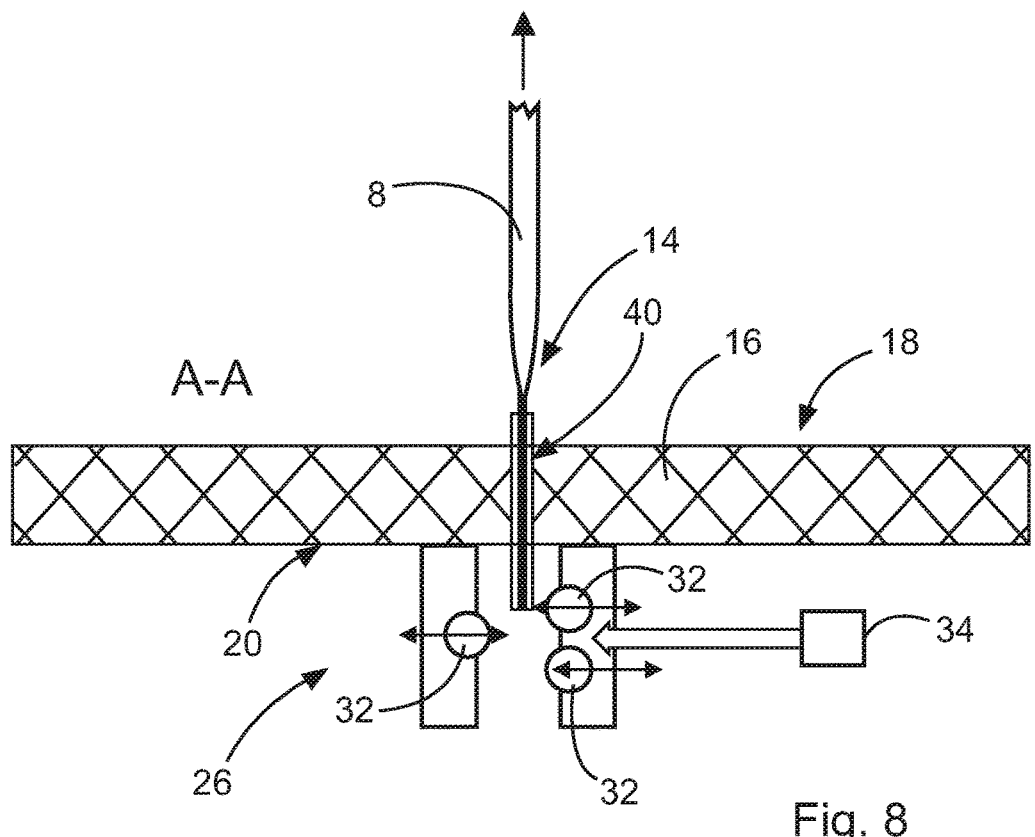

FIG. 8 shows a subsequent transition of the coating device 26 to the deactivated state. The coated reinforcing fibre 38 has been passed completely through the foam core 16, and the coating process can be interrupted.

Figure 9:
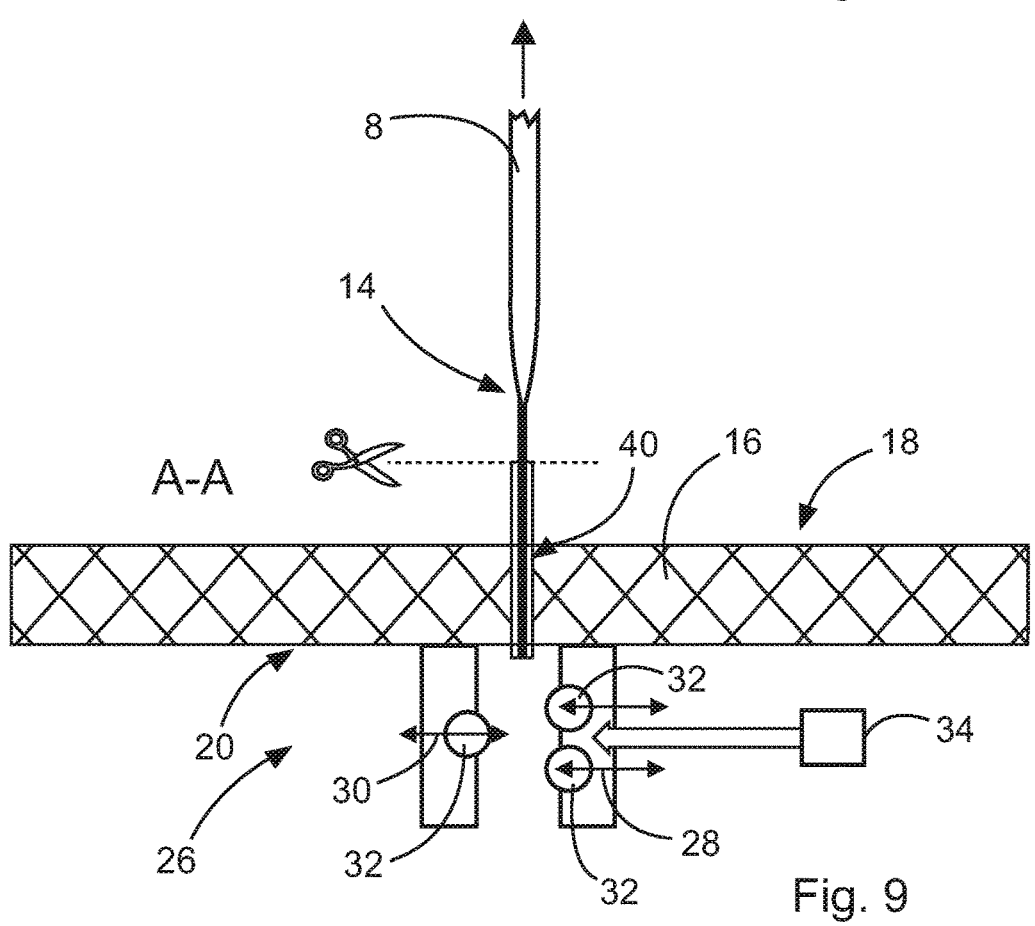

Finally, in FIG. 9, the cutting to size of the reinforcing fibre 38 is indicated. The cut-to-length reinforcing fibre 38 could be folded over and laid on the main surfaces 18 and 20 of the foam core 16. After this, the previously explained process can be immediately repeated.

For the sake of completeness, it should be noted that "having" does not exclude any other elements or steps and "a" or "an" does not exclude a multiplicity. It should furthermore be noted that features which have been described with reference to one of the above embodiment examples can also be used in combination with other features of other embodiment examples described above. Reference signs in the claims should not be regarded as restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS 2 system
4 needle plate/substrate
6 needle hole
8 needle
10 sewing device
12 fibre supply device
14 hook
16 foam core
18 first main surface
20 second main surface
22 first covering layer
24 second covering layer
25 first preform
26 coating device
28 first slide
30 second slide
32 calender roll
34 resin feed device
36 loop
38 reinforcing fibre

The invention claimed is:

1. A method for producing a component or semifinished product with a fibre-reinforced foam core, comprising:
supplying a flat or three-dimensionally curved/shaped foam core having a first main surface and an opposite, second main surface;
positioning at least one needle at the first main surface of the foam core;
piercing the foam core with the needle, with the result that a needle tip penetrates through the first main surface into the foam core and then through the second main surface;
hooking a reinforcing fibre into the needle tip;
pulling the needle back, with the result that the reinforcing fibre is pulled through the foam core; and
coating the reinforcing fibre with a liquid or powdered resin while the needle is being pulled back
wherein piercing by the needle comprises penetration into a needle hole of a needle plate, on which the foam core is laid, and
wherein coating of the reinforcing fibre is carried out by a coating device in the needle hole.

2. The method according to claim 1, wherein coating is begun as soon as the reinforcing fibre is in the process of entering the foam core, and wherein coating is ended as soon as the reinforcing fibre has been pulled completely into the foam core.

3. The method according to claim 1, wherein the coating device has a roll arrangement, through which the reinforcing fibre is passed.

4. The method according to claim 3, wherein the roll arrangement has at least two calender rolls, configured to be moved into surface contact with the reinforcing fibre for coating and to be moved away from the reinforcing fibre to interrupt coating.

5. The method according to claim 4, wherein, to produce the surface contact, the calender rolls are moved up to the reinforcing fibre on two sides to enclose said fibre.

6. The method according to claim 4, wherein the calender rolls are moved into surface contact with the reinforcing fibre as soon as the needle tip is in the process of leaving the needle hole.

7. The method according to claim 1, further comprising arranging at least one covering layer on at least one of the first main surface and the second main surface to form a first preform.

* * * * *